(12) United States Patent
Kountanya et al.

(10) Patent No.: US 12,717,301 B2
(45) Date of Patent: Aug. 25, 2026

(54) MACHINING FIXTURE FORCE BALANCING

(71) Applicant: RTX Corporation, Farmington, CT (US)

(72) Inventors: Raja Krishnan Kountanya, Vernon, CT (US); Alexander R. Angyal, Woodbury, CT (US); Jean-Philippe A. Thomas, Wethersfield, CT (US); James M. Levandowski, West Simsbury, CT (US); Jose A. Lopes, Ellington, CT (US)

(73) Assignee: RTX Corporation, Farmington, CT (US)

( * ) Notice: Subject to any disclaimer, the term of this patent is extended or adjusted under 35 U.S.C. 154(b) by 380 days.

(21) Appl. No.: 18/285,432

(22) PCT Filed: Apr. 4, 2022

(86) PCT No.: PCT/US2022/023282

§ 371 (c)(1),
(2) Date: Oct. 3, 2023

(87) PCT Pub. No.: WO2022/212942

PCT Pub. Date: Oct. 6, 2022

(65) Prior Publication Data

US 2024/0176322 A1 May 30, 2024

Related U.S. Application Data

(60) Provisional application No. 63/170,459, filed on Apr. 3, 2021.

(51) Int. Cl.
*G05B 19/402* (2006.01)

(52) U.S. Cl.
CPC .. *G05B 19/402* (2013.01); *G05B 2219/36424* (2013.01)

(58) Field of Classification Search
CPC .. C07D 487/04; A61K 45/06; A61K 31/5025; A61K 2300/00; A61P 1/00;
(Continued)

(56) References Cited

U.S. PATENT DOCUMENTS 4,603,395 A 7/1986 Steinberger
5,546,314 A 8/1996 Brost et al.
(Continued)

OTHER PUBLICATIONS

Raja Kountanya et al., "A New Uncut Chip Thickness Model for Tilted Helical End Mills through Direct Correspondence with Local Oblique Cutting Geometry", 44th Proceedings of the North American Manufacturing Research Institution of SME, Nov. 2016, pp. 386-398, vol. 5, Elsevier, Amsterdam, Netherlands.
(Continued)

*Primary Examiner* — Kidest Worku
(74) *Attorney, Agent, or Firm* — Bachman & LaPointe, P.C.

(57) ABSTRACT

A method for configuring a fixture for use in machining of sequential parts via a machine tool, for a planned machining movement of the machining element, uses a model of the part and fixture. Respective reaction forces at the plurality of part contact references are computed. Responsive to computation of a negative reaction force at a said part contact reference, a modification is made to a machining parameter.

22 Claims, 10 Drawing Sheets

(58) Field of Classification Search
CPC .......... A61P 25/00; A61P 29/00; A61P 25/20; A61P 25/28
See application file for complete search history.

(56) References Cited

U.S. PATENT DOCUMENTS

| | | | | |
|---|---|---|---|---|
| 7,110,849 | B2 | 9/2006 | Landers et al. | |
| 10,486,415 | B2 | 11/2019 | Markov et al. | |
| 10,500,678 | B2 | 12/2019 | Dong et al. | |
| 2009/0096145 | A1 | 4/2009 | Ring et al. | |
| 2010/0230868 | A1 * | 9/2010 | Oles | B29C 49/36 264/543 |
| 2012/0175832 | A1 * | 7/2012 | Hacker | B23B 11/00 269/53 |
| 2015/0035215 | A1 * | 2/2015 | Baklund | B21D 39/20 269/53 |
| 2016/0139587 | A1 | 5/2016 | Jarvis et al. | |
| 2016/0176001 | A1 * | 6/2016 | Rinaldi | B23Q 1/035 269/21 |
| 2017/0036780 | A1 | 2/2017 | Bickerstaff et al. | |
| 2017/0173704 | A1 * | 6/2017 | Popp | B23B 31/117 |
| 2017/0320181 | A1 * | 11/2017 | Lee | G05B 19/401 |
| 2019/0255636 | A1 * | 8/2019 | Stadtfeld | B23C 5/22 |

OTHER PUBLICATIONS

Jianbo Sui et al., "Development of a Mechanistic Force Model for CNC Drilling Process Simulation", 44th Proceedings of the North American Manufacturing Research Institution of SME, Nov. 2016, pp. 787-797, vol. 5, Elsevier, Amsterdam, Netherlands.

Raja Kountanya et al., Time-Averaged and Instantaneous Mechanistic Models Using Artificial Force Synthesis in Helical End Milling, Procedia Manufacturing, Jul. 2017, pp. 737-749, vol. 10, Elsevier, Amsterdam, Netherlands.

Raja Kountanya et al., "Force and Temperature Modeling in 5-Axis Grinding", Procedia Manufacturing, Sep. 2018, pp. 521-529, vol. 26, Elsevier, Amsterdam, Netherlands.

Raja Kountanya et al., "Specific Material Removal Rate Calculation in Five-Axis Grinding", Journal of Manufacturing Science and Engineering, Dec. 2017, vol. 139, American Society of Mechanical Engineers, New York, New York.

International Search Report and Written Opinion dated Apr. 4, 2022 for PCT Patent Application No. PCT/US22/23282.

European Official Action dated Sep. 16, 2024 for European Patent Application No. 22782363.0.

Ravi O. Mittal et al., "Dynamic Modeling of the Fixture-Workpiece System", Robotics and Computer Integrated Manufacturing, Jan. 1, 1991, pp. 201-217, vol. 8, No. 4, Elsevier Science Publishers, BV, Amsterdam, the Netherlands.

Y.F. Wang et al., "A Model-Based Online Control of Optimal Fixturing Process", International Conference on Robotics and Automation, Albuquerque, New Mexico, Proceedings of the 1997 IEEE, Apr. 20, 1997, pp. 2019-2024, IEEE, Piscataway, New Jersey.

European Search Report dated Nov. 8, 2023 for European Patent Application No. 22782363.0.

European Official Letter dated Nov. 20, 2023 for European Patent Application No. 22782363.0.

* cited by examiner

MACHINING FIXTURE FORCE BALANCING

CROSS-REFERENCE TO RELATED APPLICATION

Benefit is claimed of U.S. Patent Application No. 63/170,459, filed Apr. 3, 2021, and entitled "Machining Fixture Force Balancing", the disclosure of which is incorporated by reference herein in its entirety as if set forth at length.

BACKGROUND

The disclosure relates to gas turbine engines. More particularly, the disclosure relates to machining of metallic components (parts or elements) such as blades and vanes.

Gas turbine engines (used in propulsion and power applications and broadly inclusive of turbojets, turboprops, turbofans, turboshafts, industrial gas turbines, and the like) typically include precision-machined cast parts.

For example, with elements such as blades and vanes the contours of mounting features such as roots, platforms, and shrouds are roughly cast and then precision ground.

To grind features on the element, the part is located/registered in a grinding fixture to prevent movement during machining. The grinding fixture has multiple datum features for the part to be fully constrained during a high-force grind operation. The part is clamped to the fixture for machining.

During the grind operation the forces from the grinding tool (e.g., grinding wheel) on the part may lift the part off the fixture datum surfaces causing the ground part to be out of dimensional and geometric tolerance. This nonconformity may be detected only substantially later (e.g., caught in an inspection immediately post-grinding or yet later). Depending on circumstances, the inspection may not reveal the cause of the nonconformity which may be significant if multiple grinding steps are performed in successive fixtures. Weight reduction considerations have led to thin material cross-sections and reduced rigidity, thereby increasing chances of and/or significance of part lift-off during grinding.

SUMMARY

One aspect of the disclosure involves a method for configuring a fixture for use in machining of sequential parts via a machine tool. The fixture comprises: a body; a plurality of part contact references for registering a part being machined; and at least one clamp for holding the part against the plurality of part contact references. The machine tool comprises: a machining element; and a driver coupled to drive the machining element about a rotation axis. A manipulator moves the machining element relative to the part. The method comprises, for a planned machining movement of the machining element and using a model of the part and fixture: computing respective reaction forces at the plurality of part contact references; and responsive to computation of a negative reaction force at a said part contact reference, a modification.

In a further embodiment of any of the foregoing embodiments, additionally and/or alternatively, the modification comprises at least one of: modifying in the model clamping force of the at least one clamp; modifying in the model one or more positions of the at least one clamp; modifying in the model one or more positions of the plurality of part contact references; and modifying the planned machining movement.

In a further embodiment of any of the foregoing embodiments, additionally and/or alternatively, the manipulator moves the machine tool and the part remains stationary.

In a further embodiment of any of the foregoing embodiments, additionally and/or alternatively, said modification comprises said modifying in the model clamping force of the at least one clamp.

In a further embodiment of any of the foregoing embodiments, additionally and/or alternatively, said modification comprises said modifying in the model one or more positions of the at least one clamp.

In a further embodiment of any of the foregoing embodiments, additionally and/or alternatively, said modification comprises said modifying in the model one or more positions of the plurality of part contact references.

In a further embodiment of any of the foregoing embodiments, additionally and/or alternatively, said modification comprises said modifying the planned machining movement (e.g., said modifying being a speed of the planned machining movement).

In a further embodiment of any of the foregoing embodiments, additionally and/or alternatively, the machining element is an abrasive element.

In a further embodiment of any of the foregoing embodiments, additionally and/or alternatively, the plurality of part contact references comprise: at least one datum pad characterized by a datum pad contact area; and at least one rest characterized by a rest contact area greater than the datum pad contact area.

In a further embodiment of any of the foregoing embodiments, additionally and/or alternatively, the modification does not comprise: modifying in the model any position of the at least one datum pad.

In a further embodiment of any of the foregoing embodiments, additionally and/or alternatively, the computing and the modification are performed iteratively.

In a further embodiment of any of the foregoing embodiments, additionally and/or alternatively, the modification: reduces a reaction force of at least one of the datum pads.

In a further embodiment of any of the foregoing embodiments, additionally and/or alternatively, the reducing a reaction force: reduces a peak reaction force of a first of the datum pads and reduces a median reaction force of a second of the datum pads while reducing or eliminating a magnitude of said negative reaction force at a third of the datum pads.

In a further embodiment of any of the foregoing embodiments, additionally and/or alternatively, the computing respective reaction forces at the plurality of part contact references comprises: calculating machining forces associated with the machining movement; and based upon clamping forces and the calculated machining forces calculating the respective reaction forces at the plurality of part contact references.

In a further embodiment of any of the foregoing embodiments, additionally and/or alternatively, the method includes inserting: pre-determined force vector(s) of the at least one clamp as said clamping forces; and unit vectors for the plurality of part contact references.

In a further embodiment of any of the foregoing embodiments, additionally and/or alternatively, the reaction forces are calculated by equation (2):

$$x_{ln} = m^T.(m.m^T)^{-1}.b$$

wherein:

x is a column vector having as many rows as the number of part contact references;

b is a column vector having six rows and is determined by superposition of XYZ force and moments caused by the clamping and machining forces in a work coordinate system (WCS); and m is a matrix with six rows and as many columns as the number of part contact references.

In a further embodiment of any of the foregoing embodiments, additionally and/or alternatively, an elongate contact area of a rest contact reference of the plurality of part contact references is modeled as: two independent forces fixed to ends of a line lying on the contact area.

In a further embodiment of any of the foregoing embodiments, additionally and/or alternatively, a frictional engagement of a rest contact reference of the plurality of part contact references is modeled as: giving rise to reaction forces normal to the plane of engagement; and in-plane frictional forces.

In a further embodiment of any of the foregoing embodiments, additionally and/or alternatively, the modifying the planned machining movement comprises: altering feed rates in individual moves.

In a further embodiment of any of the foregoing embodiments, additionally and/or alternatively, the method includes: machining a part according to the modified planned machining movement; building a fixture according to the modification; or implementing the modification on an existing fixture.

In a further embodiment of any of the foregoing embodiments, additionally and/or alternatively, an apparatus is configured to perform the method and comprises: one or more processors; and storage containing programming for execution by the one or more processors. The programming is configured to: receive the model of the part and fixture; and compute said respective reaction forces at the plurality of part contact references.

In a further embodiment of any of the foregoing embodiments, additionally and/or alternatively, the apparatus further comprising a display, wherein: the programming is configured to display on the display a plot of reaction forces of the plurality of part contact references and the at least one clamp.

In a further embodiment of any of the foregoing embodiments, additionally and/or alternatively, the plot has an x axis of CLStep # and a y axis of force.

In a further embodiment of any of the foregoing embodiments, additionally and/or alternatively, the apparatus further comprises a display, wherein: the programming is configured to display on the display a representation of the machining element, the part, the plurality of part contact references, and the at least one clamp.

In a further embodiment of any of the foregoing embodiments, additionally and/or alternatively, the programming is configured to highlight on the representation a location of the computed negative reaction force at said part contact reference.

In a further embodiment of any of the foregoing embodiments, additionally and/or alternatively, the programming is configured to allow the user to modify in the model positions of one or more of the clamp(s).

In a further embodiment of any of the foregoing embodiments, additionally and/or alternatively, the part contact references comprise one or more rests and a plurality of datum pads and the programming is configured to allow the user to modify in the model positions of one or more of the clamp(s) and/or rest(s).

In a further embodiment of any of the foregoing embodiments, additionally and/or alternatively, the programming is configured to allow the user to modify in the model clamping forces/loads.

In a further embodiment of any of the foregoing embodiments, additionally and/or alternatively, the programming is configured to allow the user to modify a speed of the planned machining movement.

In a further embodiment of any of the foregoing embodiments, additionally and/or alternatively, the processor, storage, user input means, and display are on a single computer.

A further aspect of the disclosure involves, a method for configuring a fixture for use in machining of sequential parts via a machine tool. The fixture comprises: a body; a plurality of part contact references for registering a part being machined; and at least one clamp for holding the part against the plurality of part contact references. The machine tool comprises: a machining element; and a driver coupled to drive the machining element about a rotation axis. A manipulator moves the machining element relative to the part. The method comprises for a planned machining movement of the machining element and using a model of the part and fixture: a step for calculating machining forces associated with the machining movement; and a step for calculating respective reaction forces at the plurality of part contact references.

In a further embodiment of any of the foregoing embodiments, additionally and/or alternatively, the method includes a step for determining whether a modifying of the planned machining movement is sufficient.

In a further embodiment of any of the foregoing embodiments, additionally and/or alternatively, the manipulator moves the workpiece relative to a factory frame of reference.

In a further embodiment of any of the foregoing embodiments, additionally and/or alternatively, the manipulator is moves the machining element relative to a factory frame of reference.

Another aspect of the disclosure involves an apparatus configured modify a process for machining of sequential parts via a machine tool, wherein a manipulator moves the machining element relative to a fixture holding the part being machined. The fixture comprises: a body; a plurality of part contact references for registering a part being machined; and at least one clamp for holding the part against the plurality of part contact references. The machine tool comprises: a machining element; and a driver coupled to drive the machining element about a rotation axis. The apparatus comprises: one or more processors; and storage containing programming for execution by the one or more processors. The programming is configured to: receive the model of the part and fixture; and compute respective reaction forces at the plurality of part contact references.

Other aspects of the disclosure involve a non-transitory computer readable storage medium having data stored therein representing software executable by a computer, the software including instructions for executing any of the foregoing methods or methods described below. Example media include optical disks, solid state memory (e.g., flash cards or entire solid state drives or other modules), magnetic drives (e.g., hard disk drives), and the like.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
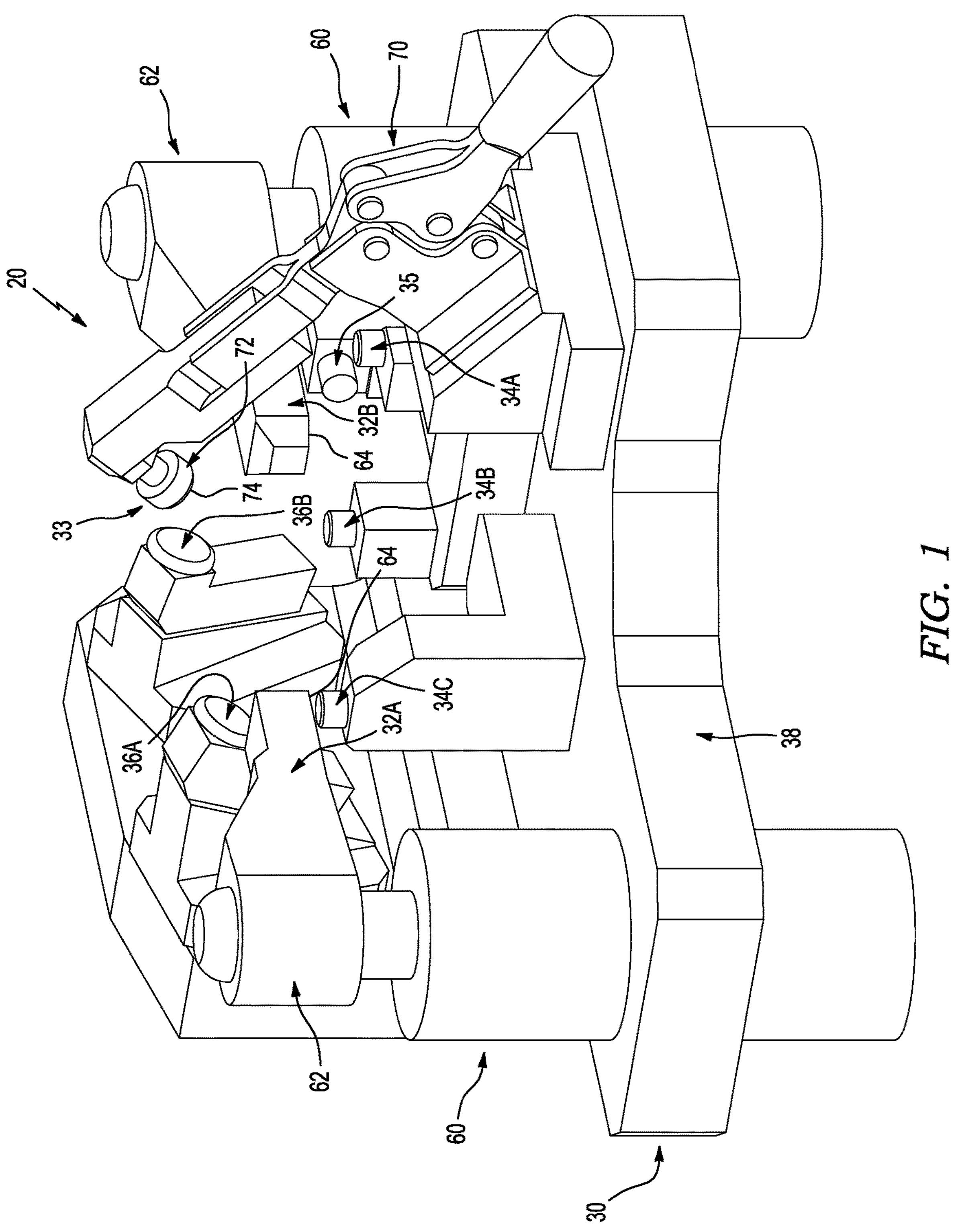
FIG. 1 is a view of a machining fixture.
Figure 3:
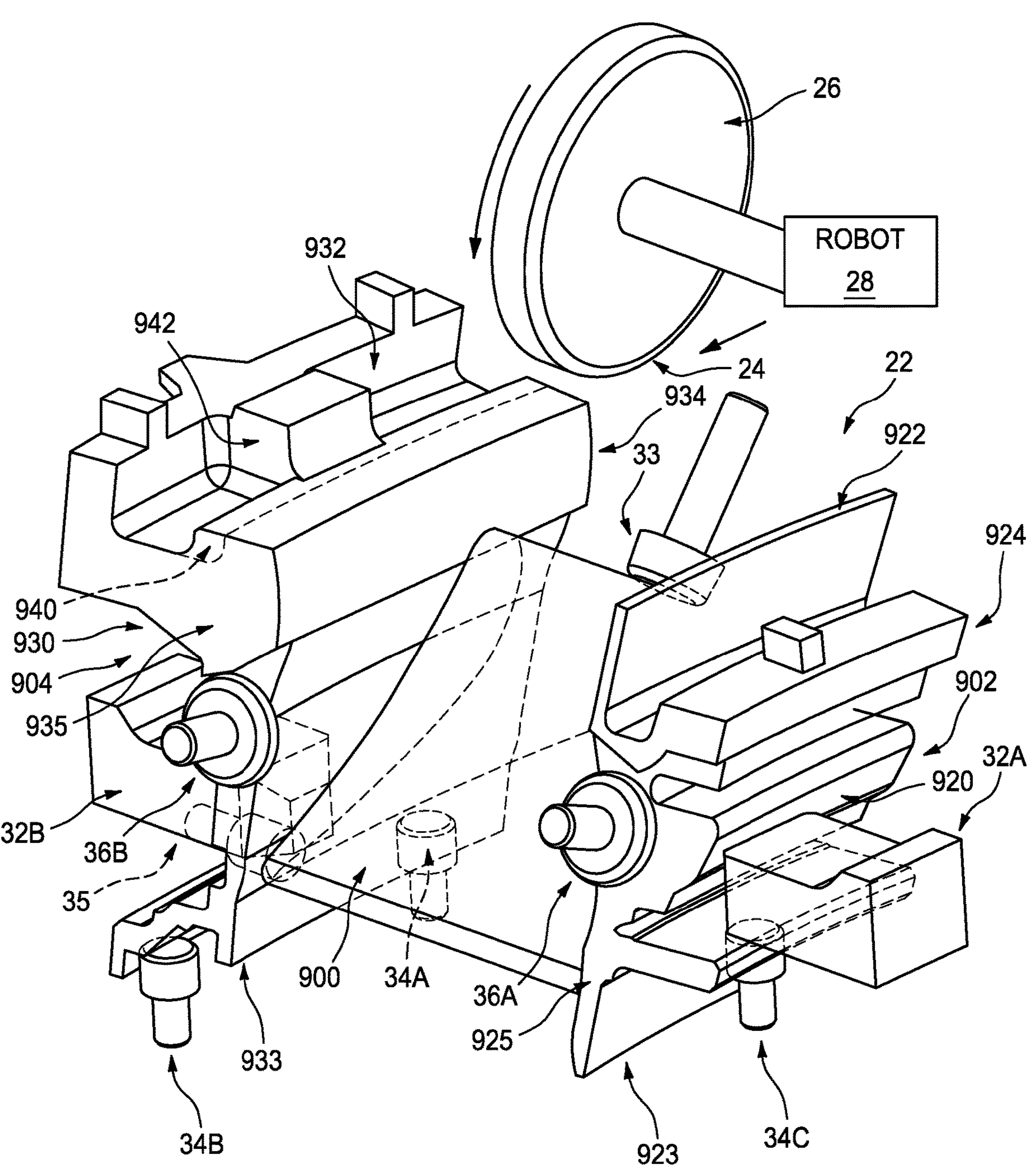
FIG. 3 is a view of the part-contacting members holding a part shown in broken lines.

FIG. 1 shows a fixture (nest) 20 for holding a part 22 (FIG. 3) in position during an operation such as machining. FIG. 3 further schematically shows a machine tool 24. An example tool 24 is an axisymmetric rotary grinding tool (e.g., having a grinding implement such as an abrasive grinding wheel 26 or abrasive quill). The tool includes a driver such as an electric motor for driving the wheel about its axis. The tool 24 may be manipulated/maneuvered via a manipulator 28 such as an industrial robot (e.g., a six-axis robot or a spindle of a five-axis machining center). Alternative tools include non-abrasive mills and broaches. Although manipulator 28 moves the tool while the part/workpiece position remains fixed, the relative movement is relevant. Thus, alternatives may involve both being manipulated by manipulators in the factory frame of reference or may involve a stationary tool and manipulation only of the part/workpiece (e.g., as is common in belt deburring).

The example part 22 is a gas turbine engine component. The example gas turbine engine component is a vane having an airfoil 900 extending between an inner diameter (ID) platform 902 and an outer diameter (OD) shroud 904. A vane cluster may have a plurality of airfoils 900. For a typical original manufacture machining process, the part consists of an alloy substrate (e.g., cast Ni superalloy or Ti alloy). The airfoil comprises a leading edge and a trailing edge and a pressure side and a suction side. The airfoil extends along a span between an inboard end at an OD face of the platform 902 and an outboard end at an ID face of the shroud 904.

The platform has an ID side 920, an upstream end 922, a downstream end 923, a first circumferential end 924, and a second circumferential end 925. Similarly, the shroud has an OD side 930, an upstream end 932, a downstream end 933, a first circumferential end 934, and a second circumferential end 935. The platform and shroud have various circumferentially-extending features such as mounting features (e.g., discussed below) along their non-gas path sides 920 and 930.

The fixture 20 (FIG. 1) is a complex assembly which may comprise a body 30 and one or more movable engagement/securing members such as clamps 32A, 32B, 33 (FIG. 2) for holding the part in place in the fixture 20.

The fixture body 30 (FIG. 1) defines a plurality of contact points with the part. At least some of these contact points (FIG. 2) are formed by part-contacting elements 34A-C, 35, 36A&B. The part-contacting elements are mounted to a main body structure 38 (FIG. 1—e.g., a metal frame) of the fixture body. In the example, the part-contacting elements 34A-C, 35 (FIG. 2) are datum pads; the part-contacting elements 36A, 36B are rests.

Example clamps 32A, 32B are hydraulic or pneumatic clamps (particularly, linear clamps having a hydraulic or pneumatic cylinder-type actuator 60 linearly moving a part-engaging end effector 62 having a part-engaging surface 64). Example clamp 33 is a hand-actuated toggle clamp (having a handle linkage actuator 70 linearly moving a part-engaging end effector 72 having a part-engaging surface 74).

In general, the rests are characterized by large areas to distribute the supporting force so that local contact pressure can be reduced. A general solid body has six degrees of freedom; hence a combination of planar and spherical datum pads may be used to arrest it in space. Their areas may be kept small to ensure conformity in a local region of the part. Datum pads may be planar or convex (e.g., a sector of a spherical surface effectively providing point contact) depending upon the number of degrees of freedom needing to be arrested or defined. Planar datums arrest three degrees of freedom while point contact datums using a portion of a sphere arrests one degree of freedom. Example datum pads may be made of tungsten carbide (e.g., machined to form and potentially assembled to a separate mounting piece (e.g., steel) for mounting to the remainder of the fixture body).

The datum pads 34A-C differ from the datum pad 35 in that 34A-C are small circular planar surfaces while 35 is a spherical surface. Example datum pads may be made of tungsten carbide (e.g., machined to form and potentially assembled to a separate mounting piece (e.g., steel) for mounting to the remainder of the fixture body).

In the example, the datum pads 34A and 34B have contact points on the trailing end of the shroud 904 respectively near the first circumferential end 934 and second circumferential end 935. The datum pad 34C provides a single central contact point along a downstream face of a circumferentially-extending flange of the ID platform ID side 920 near the downstream end 923.

The datum pad 35 has a contact point on an OD face of a flange of the OD shroud near the downstream end.

The rests 36A, 36B have respective contact points with the second circumferential ends of the ID platform and OD shroud generally intermediate upstream-to-downstream. Example rests may be made of tungsten carbide (e.g., machined to form and potentially assembled to a separate mounting piece (e.g., steel) for mounting to the remainder of the fixture body). In general, as noted above, the clamps and rests may have greater contact areas with the part than do the datum pads (e.g., contact areas at least 200% or at least 1000% those of the datum pads and potentially 1000 times or more higher where small datum pad areas and small datum pad contact forces are involved). This allows for force distribution on the rests and clamps but positional precision of the datum pads.

The clamp 32A contacts the upstream face of the flange opposite the datum pad 34C and its actuator draws the clamp end effector compressively toward the datum pad 34C. Similarly, the clamp 32B engages a face on the OD side 930 of the OD shroud at a location intermediate the datum pads 34A and 34B and is drawn to generally compress the OD shroud against the datum pads 34A and 34B.

The clamp 33 is shown contacting the airfoil at or near the leading edge. In an installation example, a technician hand loads the part into the fixture with clamps disengaged (e.g., retracted sufficiently clear to allow such loading). The technician then manually closes the clamp 33 to contact the part and at least temporarily hold the part engaged to the datum pads and rests. Then the technician may bring the end effectors of the clamps 32A, 32B into position and operate their actuators to bring their end effectors into compressive engagement with the part to hold the part more firmly in place for machining.

Thereafter, the tool(s) 24 perform their machining operations executing timed and manipulated trajectories in space called toolpaths. As noted above, the datum pads correspond to precise references upon which the machining is based. The tool(s) are manipulated to produce precise surfaces based on the assumption that the datum pads remain in contact with and precisely register corresponding surface portions of the part 22. If loading (e.g., loading from the reaction forces) between the tool and part cause part deformation sufficient to disengage a datum pad from the associated reference surface of the part, the resulting machined surface will lack its desired positioning and/or shape.

As is discussed further below, a modeling process models the reaction force magnitudes of the fixture body contact points including the datum pads and rests (force location and direction are known in advance but not magnitude). A negative reaction force at a datum pad corresponds to predicted part disengagement from the associated datum pad and, therefore, out-of-tolerance machining.

Figure 2:
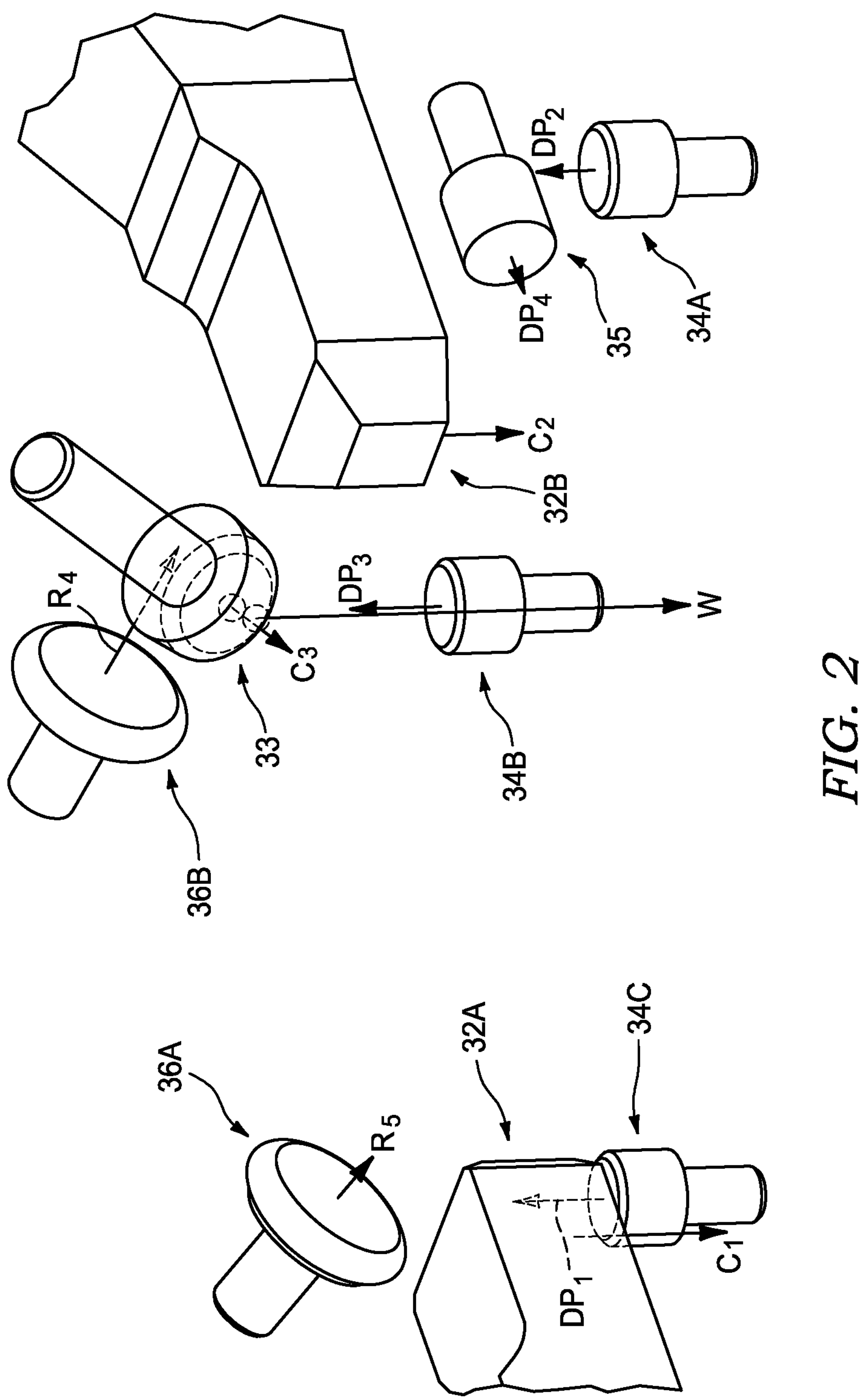
FIG. 2 is a view of isolated part-contacting members of the machining fixture.

FIG. 2 shows reaction force vectors associated with each of the clamps (known upfront in magnitude, location, and direction), datum pads, and rests. FIG. 2 also shows a weight vector of the part. FIG. 2 does not show the reaction/engagement force with the tool. Clamp force magnitudes are denoted by the letter C, rest force magnitudes by R, and datum pad force magnitudes by DP. The weight of the part is denoted by W. The subscript i is used to enumerate each of the force vectors.

To analyze and calculate reaction forces due to rests and datum pads of FIG. 2, the modeling process includes a linear algebra system for $R_i$ and $DP_i$. If $R_i$ and $DP_i$ are negative ($R_i$, $DP_i$<0) lift off from their respective locations contributing to dimensional errors is predicted. The system to solve can be written as a matrix inversion problem as in equation (1):

$$m.x = b$$

The list of force magnitudes to solve is given by the column vector x whose number of rows is the total of the number of rests and number of datum pads. The column vector b has exactly six rows and is determined by the superposition of XYZ force and moments caused by the clamping $C_i$ and grinding/milling forces $G_i$ in the work coordinate system (WCS). The matrix m has the same number of columns as x has number of rows and exactly six rows.

Usually, the equilibrium system to solve is under-determined, that is, where there are more reaction magnitudes to solve than afforded by six equations (three force, three moment balance). In terms of equation (1), the system is said to be under-determined when the matrix m is "fat" (i.e., it has more columns than rows). Such under-determined systems, in theory, have infinite solutions.

The present modeling process uses the unique "least norm" solution to minimize the sum of squares of the solved reactions. In terms of equation (1), the "least norm" solution $x_{ln}$ is one which minimizes |x| and is given by equation (2) where the "T" superscript transposes a matrix, the "−1" superscript inverts a square matrix and the "." symbol multiplies matrices:

$$x_{ln} = m^T.(m.m^T)^{-1}.b$$

Figure 4:
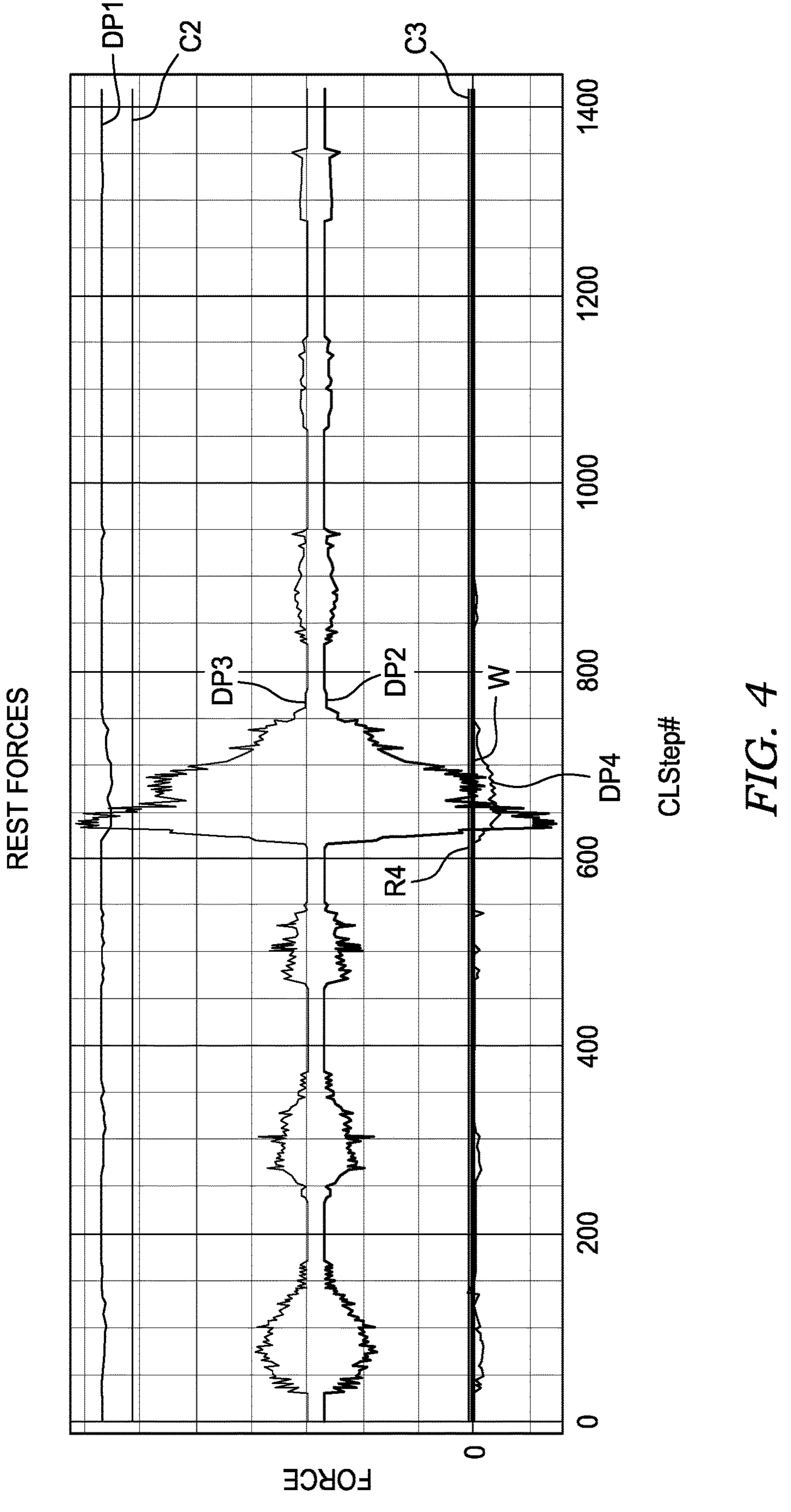
FIG. 4 is a plot of reaction force against machining model step for an example process.
Figure 4A:
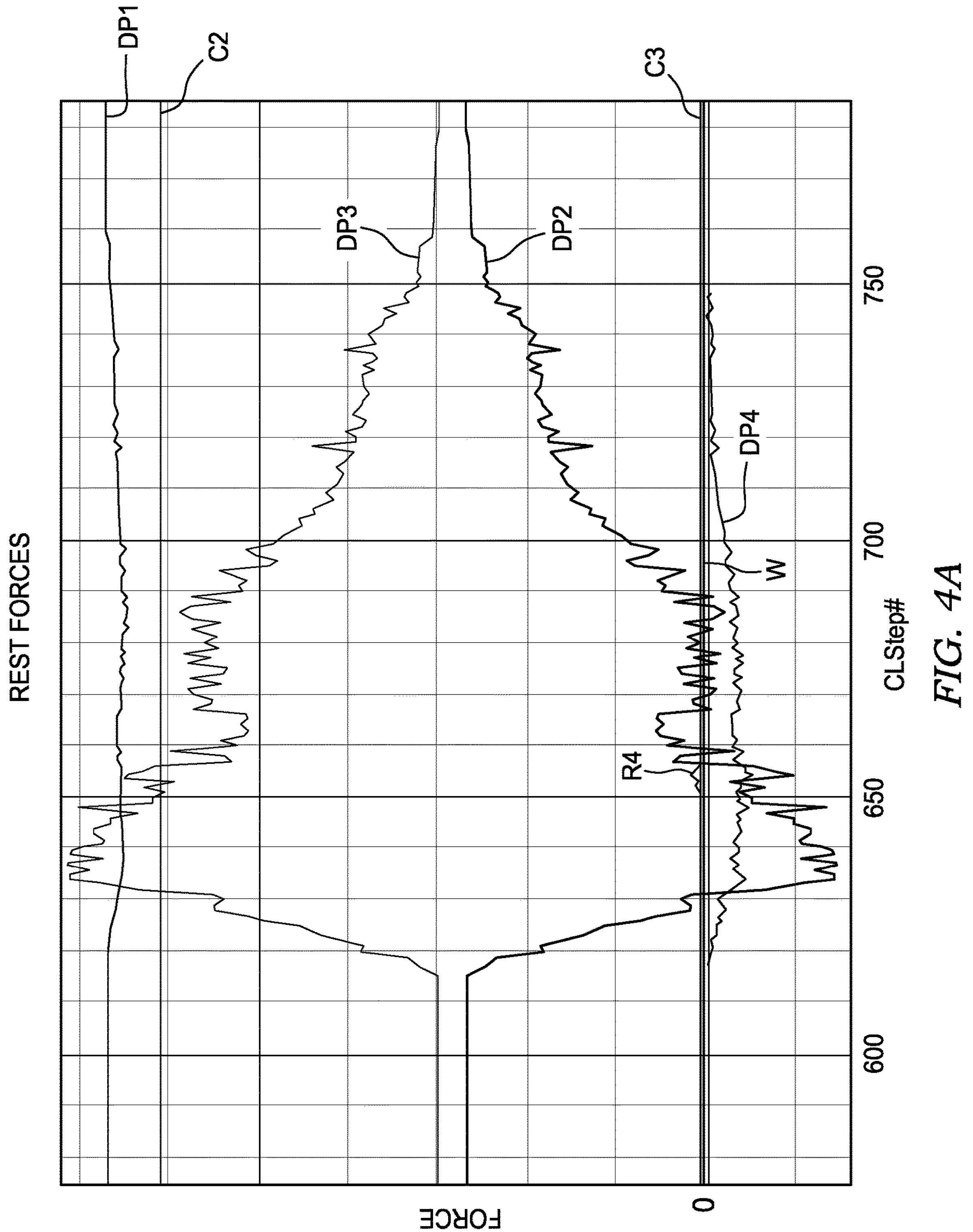
FIG. 4A is an enlarged view of a portion of the plot of FIG. 4.

As an illustrative example, FIG. 4 shows results of rest and datum pad reactions calculated using the modeling process for a single toolpath for a given configuration of datum pads, rests, and clamps and given part weight and clamping forces. FIG. 4 shows results for all incremental steps along the x axis with the index CLStep #, while FIG. 4A shows results for the portion in FIG. 4 where $DP_2$ is seen to become severely negative.

In FIG. 4, it is seen that force $DP_1$ associated with datum pad 34C remains consistently positive and high. Force $DP_3$ (associated with datum pad 34B) also remains positive but has greater fluctuations including a positive spike. Force $DP_2$ (associated with datum pad 34A) is mostly significantly positive but has a substantial drop leading to a substantial negative spike generally mirror imaging the increase in force $DP_3$. This leads to a substantial negative interval shown around example spanning CLStep #650 in FIG. 4A. Similarly, force $DP_4$ (associated with datum pad 35) has a significant drop to negative in the region overlapping the negative zone for $DP_2$.

To inquire into the reason why $DP_2$ is negative in the range of CLStep #625-760, FIG. 3 provides a clue. FIG. 3 shows a grinding wheel positioned at the beginning of a grinding pass along the OD side of the OD shroud. The pass will cut a channel 940 in a buttress. The negative $DP_2$ interval corresponds with the grinding wheel encountering a step 942 in the part. The user visualizes this by selecting CLStep #625 or a step shortly in advance and playing an animation of the grinding process starting at that point (software may display the requisite menu/interface for the selection and generation of the display). In a limited automation situation, the technician could simply revise the machining program to slow grinding wheel traversal during the interval (e.g., also via the displayed menu). However, this may be ineffective, suboptimal and/or reduce throughput.

In a key group of embodiments, the process for configuring (reconfiguring) the fixture maintains the positions of the datum pads but modifies positions of one or more of the clamp(s) and/or rest(s). The process may also modify clamping forces/loads.

Such limitations on datum pad modification are particularly relevant in situations where there is segregation between part engineering and manufacturing groups. A part engineering group may specify a design including the datum pad location and then pass the associated solid model to a manufacturing group to optimize machining and/or fixturing.

In alternative implementations, datum pad positioning may be modified. For example, an optimization process may find itself unable to avoid part lift off in the absence of such modification while still maintaining a desired processing rate or while using tools that have particular clearance issues relative to clamps, etc.

In yet further embodiments, part redesign may be necessitated. For example, if a drop to negative reaction force at a datum point is associated with machining a particular feature, the plot will reveal this based upon the machining taking place at the time of the drop/lift off. This may cause manufacturing engineers to inquire of design engineers whether the feature can be altered.

Figure 5:
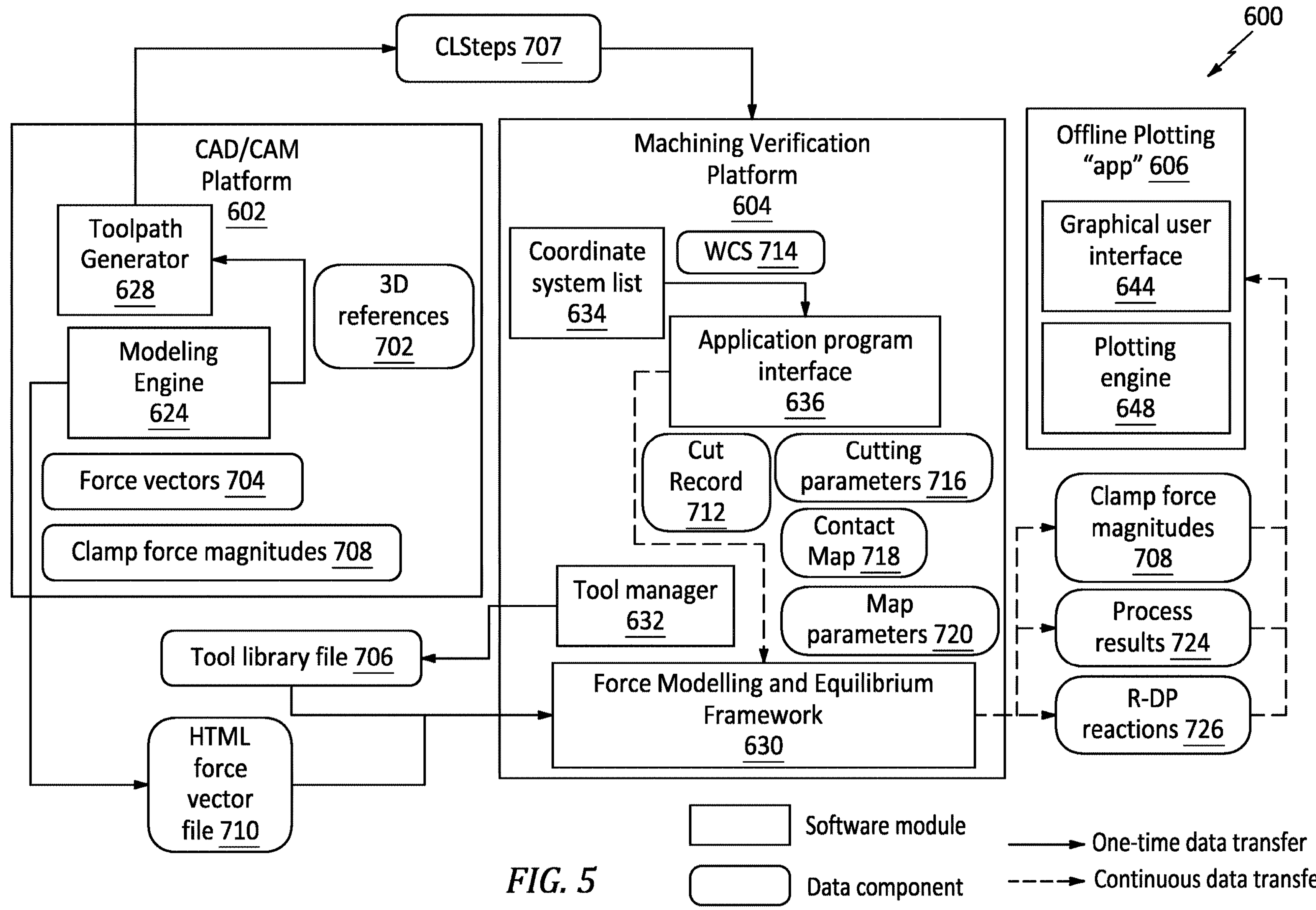
FIG. 5 is a block diagram of software systems.
Figure 9:
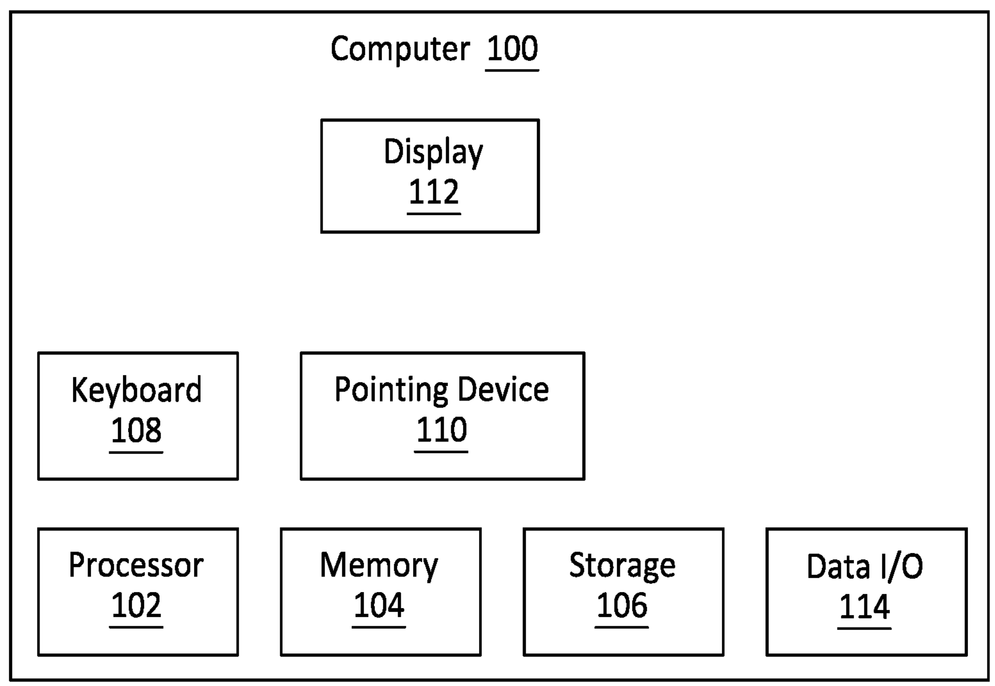
FIG. 9 is a block diagram of a computer system.

In a general example of software components and user workflow, FIG. 5 is a block diagram of software systems 600 for implementing the modeling process. In this figure, individual software components are shown using sharp cornered boxes while data elements transferred are shown using rounded-corner boxes. The software may be run on a computer 100 (FIG. 9) such as a standard commercial laptop computer (having processor 102, memory 104, storage 106, user interface I/O (e.g., keyboard 108, pointing device 110 (mouse, trackpad, and the like), and touchscreen 112 (which may also serve (pointing and selection functions) or other monitor/display), and data I/O 114 (e.g., ethernet, wifi, and the like). Data elements shown aside the respective arrows of transfer reside in the computer memory. Data elements inline with arrows reside in the storage (hard drive) of the computer as human readable HTML or XML files (e.g., when displayed on the monitor/display).

The FIG. 5 software system(s) 600 include as individual standalone software, a CAD/CAM platform 602 (an example is NX of Siemens Digital Industries Software of Plano, Texas). The software further includes a machining verification platform 604 (an example is VERICUT of CGTech Inc. of Irvine, California). The software further includes a plotting application (app) 606.

The CAD/CAM platform 602 provides menus, submenus, and dialogs containing objects and methods for the user to perform solid modeling and machining toolpath generation. The user navigates menus, submenus and dialogs to create and alter virtual 3D objects. The CAD/CAM platform 602 displays an emulation of these objects on the computer monitor/display.

The CAD/CAM platform 602 includes as software subcomponents, a modeling engine 624 and a machining toolpath generation module (toolpath generator) 628.

The solid modeling engine 624 subcomponent provides the 3D parametric construction tools. The user navigates menus, submenus and dialogs of the CAD/CAM platform 602 to construct static virtual 3D construction objects. These objects appear on the computer screen and maintain their associativity to a parent solid, surface, curve or point. They translate and rotate attached to the parent object in the computer screen when the user articulates the parent object with e.g., with the pointing device (e.g., mouse)), though they are independent of the parent and do not have a real world likeness. For example, the solid modeling engine 624 provides point, vector, surface, and solid 3D references 702 for toolpath generation and creation of reaction force vectors (of clamps, rests and datum pads).

The machining toolpath generator 628 subcomponent uses the references created by solid modeling engine 624. In response to the strategy of the generation algorithm, toolpath generator 628 creates an indexed (with the index CLStep # above) sequence CLSteps 707 ("cutter location" steps, also called a toolpath above) of moves of axisymmetric tool 24 relative to a stationary stock part 22. The axisymmetric tool, as a result, progressively intersects the stock part to generate the desired surface of the finished part at the end of the toolpath.

The software systems 600 include a machining verification platform 604 primarily used for ensuring that moves generated by the machining toolpath generator 628 do not result in undesirable motions when executed on the actual machine tool. For example, this might involve adverse motions causing collision of tool and fixture and/or machining defects (e.g., gouges and excesses). To this end, the machining verification platform 604 may generate a display on the computer monitor/display of an emulation of the motion of the tool 24 and part 22 during the machining.

The machining verification platform 604 includes as software subcomponents, a tool manager 632, a coordinate system list 634, a force modeling and equilibrium framework 630 and an application program interface 636.

The tool manager 632 subcomponent is a module that stores the definition of tools used in the machining process.

The coordinate system list 634 subcomponent stores the rotation and translation information needed to interpret the toolpaths (each toolpath referencing one of the coordinate systems in the list). More specifically, it transmits the work coordinate system WCS 714 to the application program interface 636.

The force modeling and equilibrium framework 630 subcomponent performs process modeling as is discussed further.

The application program interface 636 subcomponent receives encapsulated information from the Machining verification platform 604 and passes it with the force modeling and equilibrium framework 630.

The force modeling and equilibrium framework 630 module takes the geometrical and temporal information of a single move and calculates forces, moments and other physical quantities of interest pertaining to the actual machining process (milling, grinding, drilling, and the like) as is discussed further.

Figure 5A:
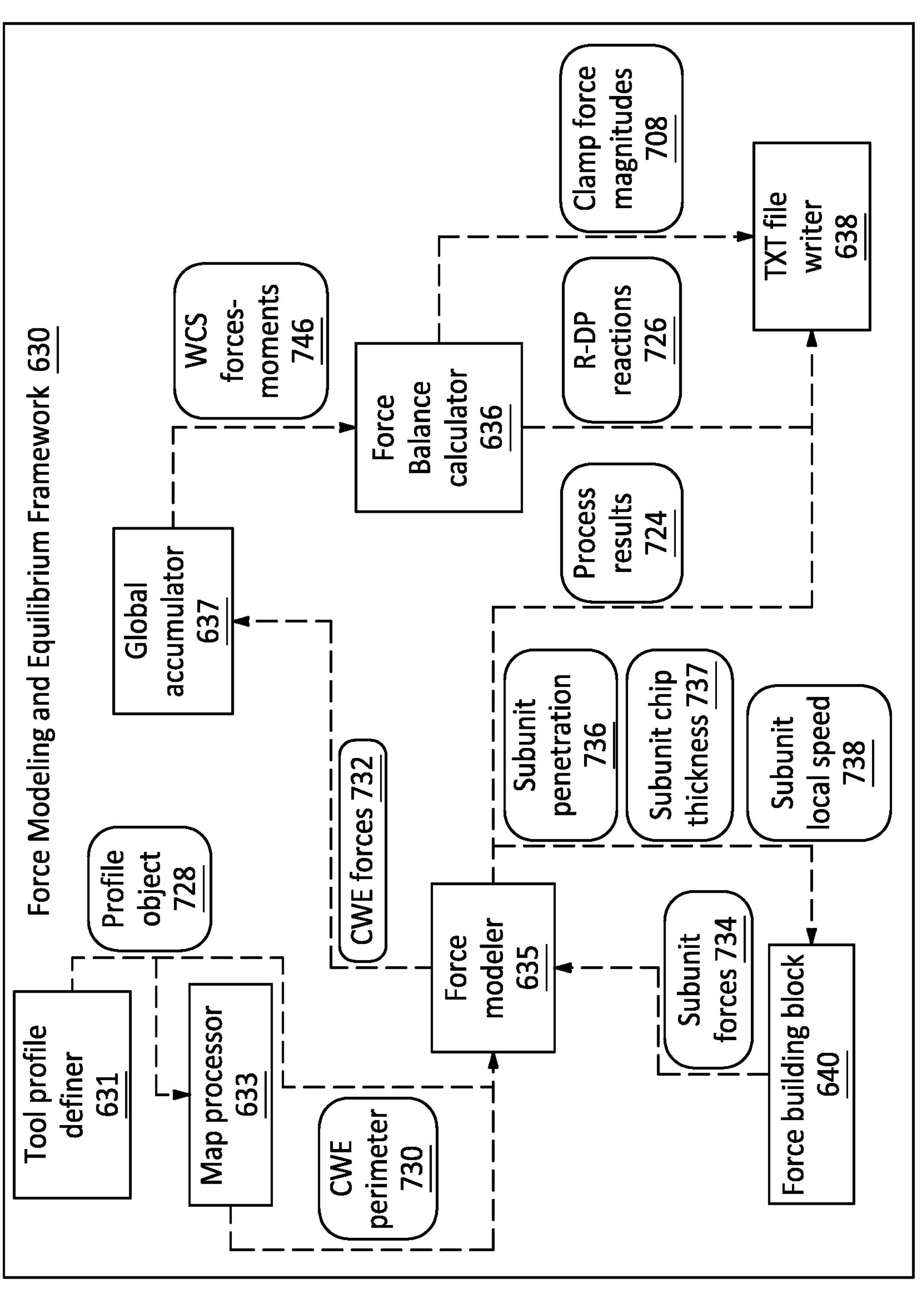
FIG. 5A is an enlarged view of a portion of the diagram of FIG. 5.

FIG. 5A shows the force modeling and equilibrium framework 630 including as internal software subcomponents a tool profile definer 631, map processor 633, force modeler 635, physics-based force building block 640, global accumulator 637, force balance calculator 636, and TXT file writer 638.

The tool profile definer 631 reads the tool definition stored by the tool manager 632 and creates a tool profile object 728 used by the map processor 633 and by force modeler 635.

The map processor 633 receives the contact map 718, map parameters 720 and cutting parameters 716 from the application program interface 636 to create the cutter workpiece engagement contour also called the CWE.

The force modeler 635 discretizes the CWE into subunits of area and calculates machining forces and other physical/geometrical quantities of interest arising due to the interaction of the tool and workpiece in the subunit.

The force building block 640 receives subunit geometric information from the force modeler 635, calculates forces arising in each subunit and returns it to the force modeler 635.

The global accumulator 637 receives forces, moments, and other allied physical/geometrical information for each of the subunits and aggregates them for the WCS 714 to send to the force balance calculator 636.

The force balance calculator 636 also receives the reaction force vectors of the clamps, rests, and datum pads from the modeling engine 624. It calculates the magnitudes of the reaction force vectors arising at the rests and datum pads using equation (2).

In an example of a machining verification user interface for the machining verification platform 604, the machining verification user interface allows the user to select, inter alia, the location to store results, the tool library file 706, and the HTML force vector file 710. The user then selects the API completion button to initiate the sequence. At that instance, the machining verification platform 604 and force modeling and equilibrium framework 630 start to work in concert. The process results 724, R-DP reactions 726 and clamp force magnitudes 708 are calculated and sent to the TXT file writer 638.

The TXT file writer 638 receives values of forces, moments, reactions, and other physical/geometrical quantities of interest from modules 635 and 636 and writes them to human readable ASCII text files (also called TXT files).

The software systems 600 also includes an offline plotting (app) 606 that reads, and parses TXT files as continuously updated by the TXT file writer 638 and displays graphs such as shown in FIGS. 4 and 4A (on the computer monitor/display). The app 606 includes as software subcomponents, a graphical user interface 644 and a plotting engine 648.

The graphical user interface 644 subcomponent may be a collection of buttons and fields instantiated at the start of the app 606 on the computer monitor/display. The human user interacts with the app 606 using the input components of the user interface I/O (e.g., mouse, keyboard, and/or touchpad) to make selections, enter data, and the like (e.g., click on the buttons and supply numerical entries such as CLStep # as input).

The plotting engine 648 subcomponent generates plots and 3D representations on the computer monitor/display. The plots are labeled by the physical quantity being plotted. The 3D representations are color coded to indicate intensities in the distribution of physical quantity on a surface are. Extreme numerical values and intensities are indicative of physical and geometrical problems to be remedied as is discussed further.

An offline plotting application ("app") 606 module contains output tabs and buttons as part of the graphical user interface 644. The offline plotting app defines a plotting area and includes an R-DP forces output. The user selects the R-DP forces output to obtain the R-DP forces results 724, R-DP reactions 726, and clamp force magnitudes 708. Then the forces outputs show accumulated results of the force balance analysis 840.

The following paragraphs describe further, the data elements exchanged between various subcomponents in 600 and 630.

In further details of example software components, the solid modeling engine 624 primarily creates a co-location of the part model within the stock referred to as an "assembly" (even though one piece—e.g., as a hybrid solid model of the casting within which the finished part is to be obtained by removal of material in chosen areas). The CAD/CAM platform 602 provides menus, submenus and dialogs on the computer display which the user follows to include the fixture subassembly into the assembly to determine the contact engagement patches between the part-contacting elements 34A-C. 35, 36A&B and part 22.

Solid modeling engine 624 secondarily generates constraints 3D references 702 to impose on the toolpath generator 628.

The CAD/CAM platform 602 provides menus, submenus, and dialogs on the computer display which the user follows to create, as part of the full assembly, reaction force vectors 704. The user places reaction force vectors 704 at the contact engagement patches corresponding to the clamps, rests and datum pads whose magnitudes are denoted by $C_i$, $R_i$ and $DP_i$ in FIG. 2. The CAD/CAM platform 602 may allow the user to store the reaction force vectors as part of the full assembly the above said reaction force vectors, in particular, adding attributes storing their names. In the case of clamps, CAD/CAM platform 602 may also allow the user to assign magnitudes (clamp force magnitudes 708) as an extra attribute to their respective force vectors. The CAD/CAM platform 602 may also allow the user to store the reaction force vectors externally (e.g., in the computer hard drive) as an HTML file called the HTML force vector file 710.

The toolpath generator 628 generates CLSteps 707 with the 3D references 702 provided by solid modeling engine 624 encoding the constrained relative (to the workpiece) motion to be executed by the manipulator 28. CLSteps 707 requires only one coordinate system WCS 714 attached to the workpiece to enumerate the relative motion of the tool and workpiece, The machining verification platform 604 displays an animation of the motion of the tool 24 relative to part 22 progressing sequentially through CLSteps 707 showing the progressive material removal of the stock part on the computer display. The machining verification platform 604, however, also detects adverse motions by tracking the motion of tool 24 more minutely than possible with the human eye in the animation on the computer display and reports it as various in-built alarms (such as color coding of part 22 in the computer screen), text file reports and/or message in its logger window in the computer screen. This (detection of adverse motions) primary use of the machining verification platform 604 with CLSteps 707 without consideration of physical interactions (such as forces, heat, energy exchange) is usually called verification. Alternative embodiments involve the actual kinematical arrangement of the machine tool or robot axes chosen to realize CLSteps 707. To rectify adverse motions reported by the machining verification platform 604, the user may follow menus, submenus and dialogs on the computer display in the CAD/CAM platform 602 to rework the toolpath. For example, the user may choose a different machining strategy from the library of strategies available in one of the menus of the toolpath generator 628. The user may also alter 3D references 702.

In one branch, the tool manager 632 stores the tool profile (sequence of contiguous lines and/or arcs starting at the apex of the tool) of the tool 24 externally as an XML file in the tool library file 706. The tool profile definer 631 within the force modeling and equilibrium framework 630 module reads the tool library file 706 and parses the XML content in it to retrieve information specific to tool 24. Using this information, the tool profile definer 631 generates a tool profile object 728 for tool 24. This profile object 728 contains the necessary formulation of the tool profile for use by the force modeling and equilibrium framework 630.

Separately in another branch, the force modeling and equilibrium framework 630 module receives geometric information relating to the instantaneous engagement (contact map 718 and map parameters 720) of the tool and the workpiece along with the necessary machine state information (cut record 712) and the instantaneous cutting parameters 716 from the application program interface 636. The map processor 633 in the force modeling and equilibrium framework 630 uses the profile object 728, contact map 718, map parameters 720, cut record 712 and cutting parameters 716 to create the engagement contour CWE. This CWE for each move of the tool is a closed 3D space curve(s) forming the boundary of the common contact patch of intersection of the tool and workpiece solid bodies. The map processor 633 sends the extents of the numerical tool surface parameters in the profile object 728 of the CWE, called the CWE perimeter 730 to the force modeler 635.

The force modeler module 635 uses the profile object 728 and the CWE perimeter 730 and discretizes the area(s) enclosed by the CWE to create subunits using principles of calculus. In each subunit, the force modeler 635 calculates geometric and temporal quantities such as subunit penetration 736 and subunit local speed 738 and transmits it to the physics-based force building block 640.

The physics-based force building block 640 estimates forces of interaction generated between the tool and workpiece. These forces are mutually equal and opposite in direction and originate from the material removal process. 640 calculates the local forces as vectors for each subunit using scaled physical models of the respective grinding or milling process with subunit quantities received from 635. It returns the computed subunit forces 734 to the force modeler 635.

The force modeler module 635 sends the collection of subunit quantities and their respective calculated forces CWE forces 732 to the global accumulator 637. The force modeler module 635 also sends reduced process results 724 to the TXT file writer 638.

As described above, the global accumulator 637 takes individual subunit forces and aggregates them to form grinding/milling forces with magnitudes $G_i$. The force modeling and equilibrium framework 630 parses the HTML force vector file 710 to recreate force vectors for clamps, rests and datum pads. Combining $G_i$ with clamping force magnitudes ($C_i$), it calculates the resultant global forces and moments for the WCS 714, called WCS forces and moments 746 to force balance calculator 636.

The force balance calculator 636 receives WCS forces and moments 746 from 637. The force balance calculator 636 also receives the force vectors 704 and clamp force magnitudes 708. It sets up matrix m, column vector x and column vector b in equation (1). The force balance calculator 636 calculates rest reactions $R_i$ and datum pad reactions $DP_i$ using equation (2). The force balance calculator 636 sends the calculated rest and datum pad reactions R-DP reactions 726 and clamp force magnitudes 708 to the TXT file writer 638.

The TXT file writer 638 sequentially stores clamp force magnitudes 708, process results 724 and R-DP reactions 726 received from force modeler 635 and force balance calculator 636 in TXT files.

Figure 6:
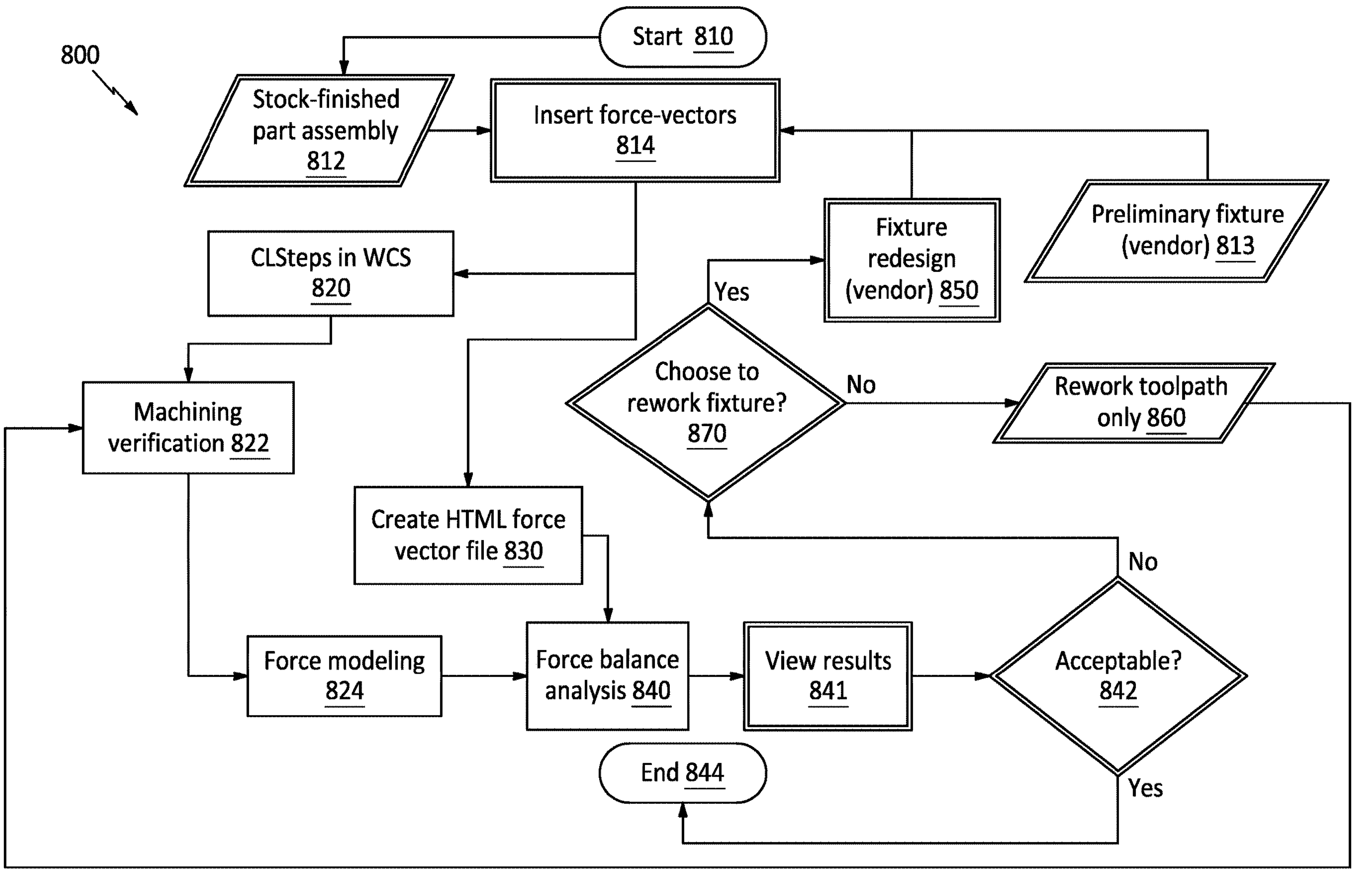
FIG. 6 is a flowchart of a process/fixture optimization.

In an example of user workflow, FIG. 6 is a workflow flowchart of a basic process 800. It shows the sequence of steps executed by a combination of human user (double-lined cells) and computer/software (single-lined cells) interventions.

In the FIG. 6 method, starting from 810, the user obtains 812 stock (e.g., raw casting) and finished part solid models and loads them to the CAD/CAM platform 602. Because the finished part is obtained by removing material from the stock, the user follows menus in the CAD/CAM platform 602 to position the finished part within the 3D domain of the stock part in such a way that a sequence of planned material removal operations will result in the stock transforming into the finished part.

In this example, the user also obtains a preliminary fixture model 813 (e.g., a solid model including clamping forces) and load it to the CAD/CAM platform 602. For example, a machining vendor/contractor may engineer the preliminary fixture based on the stock-part assembly information.

The user follows menus in the CAD/CAM platform 602 to insert 814 force vectors 704 for rests, datum pads and clamps For clamps, the magnitudes are prescribed as clamp force magnitudes 708. The user chooses the normal to the clamp, rest or datum pad surface exerting the force on the part 22 (FIG. 3) for the direction of the force vectors 704. When the contact area is small ($<0.25$ in$^2$) such as those of part-contacting elements 34A-C, 35, 36A&B, the user chooses the centroid of the contact area as the location of the force vectors 704. Simple cases when large areas of contact, such as long strips, are encountered are addressed in alternative embodiments discussed below.

A typical user interface for CAD/CAM platform 602 may contain 3D object display sections showing the workpiece, fixture and tool. The user interface may also contain a datums menu. The user manipulates fixture 20 and orients it to the desired contact surface using the user interface. The user may select a datums menu button. The user interface opens a vector dialog. The vector dialog contains a point menu and direction menu. The user choses the point on the contact surface with the point menu. As an example, the user choses a 3D point in a 3D object display section. The user then selects, in the direction menu, the normal direction (perpendicular to the plane) of the contact surface. As an example, the user choses a 3D plane in the object display and the system creates the vector C1.

Then, in one parallel branch 820, the user follows menus in the CAD/CAM platform 602 to generate CLSteps 707 in WCS 714 by the toolpath generator 628. The user loads the CLSteps 707 and stock-part-fixture assembly into machining verification platform 604. The user defines the tool geometry in the tool manager 632. The user simulates CLSteps 707 in the machining verification platform 604 with the force modeling and equilibrium framework platform 606 connected to the application program interface 636.

The force modeling and equilibrium framework 630 calculates 824 resultant forces and moment components for WCS 714.

In another branch 830, the user follows menus in the CAD/CAM platform 602 to write the HTML force vector file 710.

The outputs of the branches feed into a force balance analysis 840 performed by the force balance calculator 636. During run-time (i.e., execution of the toolpath in the machining verification platform 604) the force modeling and equilibrium framework 630 reads HTML force vector file 710 and collates with the force distribution within the CWE to calculate the rest and datum pad reactions R-DP reactions 726.

In a result viewing process 841, the human user may instantiate app 606 before the commencement of a toolpath by starting the app's executable. The graphical user interface 644 provides buttons on the computer screen for the user to reload clamp force magnitudes 708, process results 724 and R-DP reactions 726. The user may interact with more buttons of the graphical user interface 644 to direct the plotting engine 648 to regenerate plots (e.g., FIG. 4), on-the-fly, i.e., as the tool path progresses inside the machining verification platform 604.

The plotting engine 648 may generate plots on the computer screen allowing the user to manipulate (for e.g., zoom, pan and snapshot). When data may appear clustered and dense, the user may manipulate the plots and deduce phenomena at macro- and micro-length and time scales. The user may use buttons on the computer screen provided the graphical user interface 644, to also compare results of plots of two different physical or geometrical quantities to correlate or confirm phenomena which are hypothesized and decide on the rectification actions.

In an evaluation stage 842, the user may manipulate plots of reaction forces on the y axis and CLStep # on the x axis on the computer screen generated by the plotting engine 648, and determine whether datum pad reaction forces are sufficiently positive.

If the datum pad reaction forces are determined 842 sufficiently positive (not excessively negative), the user may follow menus, submenus and dialogs on the computer display provided by the CAD/CAM platform 602 to save the fixture design and toolpath at the current iteration in the computer hard drive and the process ends 844. The fixture design may be exported to manufacture or modify a fixture. The toolpath may be programmed into the machine tool(s). Then parts may be serially manufactured by the toolpath using the fixture. The determination of sufficiency may be made by the user using engineering judgment and experience or may be made by the software applying rules. The latter may include aspects of machine learning.

If the evaluation/determination 842 is not sufficiently positive, the risk of undesirable lift-off from the datums is unacceptable. In stage 870, the user (or software) may apply engineering judgement to determine whether any reactions are not so negative that they warrant iteration of the fixture design itself.

If the fixture is not to be reworked, in a toolpath rework 860 the user may follow menus, submenus and dialogs on the computer display provided by the CAD/CAM platform 602 to generate a new toolpath (changing tool geometry, process parameters or toolpath strategies) with the existing fixture using the CAD/CAM platform 602 and feeds it back as new CLSteps 707 to the machining verification platform 604 at step 822.

Or, when the user determination 870 is that no amount of toolpath rework 860 would produce satisfactory datum pad reactions, the user requests the vendor to iterate 850 on the design of the fixture. The vendor may redesign to move clamps, change clamping forces etc. and adjust the required support structures. Normally the datum pads cannot be moved to accommodate the machining process. The vendor may only electronically transmit the revision the user as a new fixture assembly for the same stock-part assembly. The user may follow menus in the CAD/CAM platform 602 to insert 814 force vectors 704 and iteration continues.

Regarding further variations, as noted above, part weight may be considered. It may effectively be modeled as a clamping force. But two factors make this generally unnecessary or impractical. First is that part weight is generally very low compared to clamping forces and is statistically irrelevant. Second is that where the part is being manipulated (alternatively to the tool or in addition to the tool), consideration of part weight would become more computationally complex.

As a further variation, the datum pad reaction forces may be optimized to avoid too high a force (baseline and spike). High force may be associated with contact point deformation that reduces precision. For example, in FIG. 4 the $DP_3$ spike will likely be reduced when the $DP_2$ drop is addressed. However, $DP_1$ is generally much higher than $DP_2$ and $DP_3$. $DP_1$ is high not just due to a spike as in $DP_3$ but is high in median value and static value (just clamping forces before tool engagement). $DP_4$ is generally slightly above zero except for the noted negative drop. A further modification could be made to reduce $DP_1$ (median and static values). There may be an upper limit (or separate spike/peak and median/static limits) set on the datum point forces based on the particular form and size of datum pad (e.g., lower threshold for a spherical pad than a planar pad). Rest forces, are not subject to these constraints.

Figure 7:
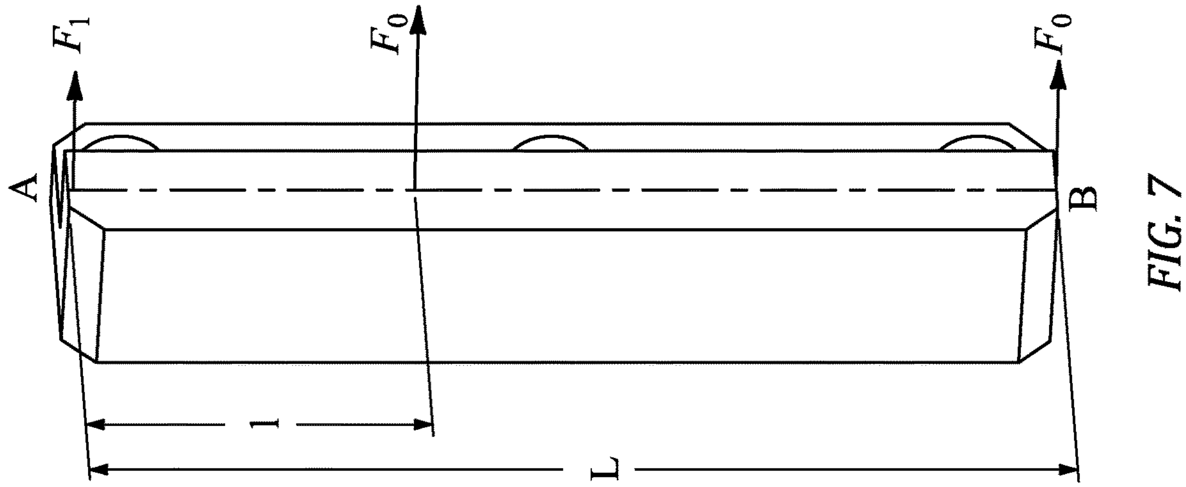
FIG. 7 is a view of a long strip-like contact.

Although most forces at clamps and those arising at rests and datum pads can be idealized as point forces in 830, instances of forces distributed over a pre-determined area arise from time to time. The CAD modeling engine 624 may address this in 814 using principles of mechanical statics as follows. FIG. 7 shows a long strip-like rest such as a parallel. Here, the net reaction force of the strip perpendicular to its plane is needed to be known regardless of the distribution the line AB joining the midpoints of the end segments. Reaction is fixed only in direction (normal to surface). In that case then assigning two end forces $F_1$ and $F_2$ fixed in location and direction (perpendicular to the plane) and undetermined magnitude allow solution of the total reaction F also assigning uniquely position along AB. As a matter of simple algebra, equation (3) calculates the magnitude of F:

$$F = F_0 + F_1$$

Equation (4) calculates its location:

$$l = \frac{F_0 L}{F_0 + F_1}$$

The logic is summarized as follows: lump pressure distribution into one force; lumped force vector constrained to lie along line joining ends' midpoints; assign two forces at end points; solve magnitude of end point forces; calculate magnitude and location of lumped force using equations (3) and (4).

Figure 8:
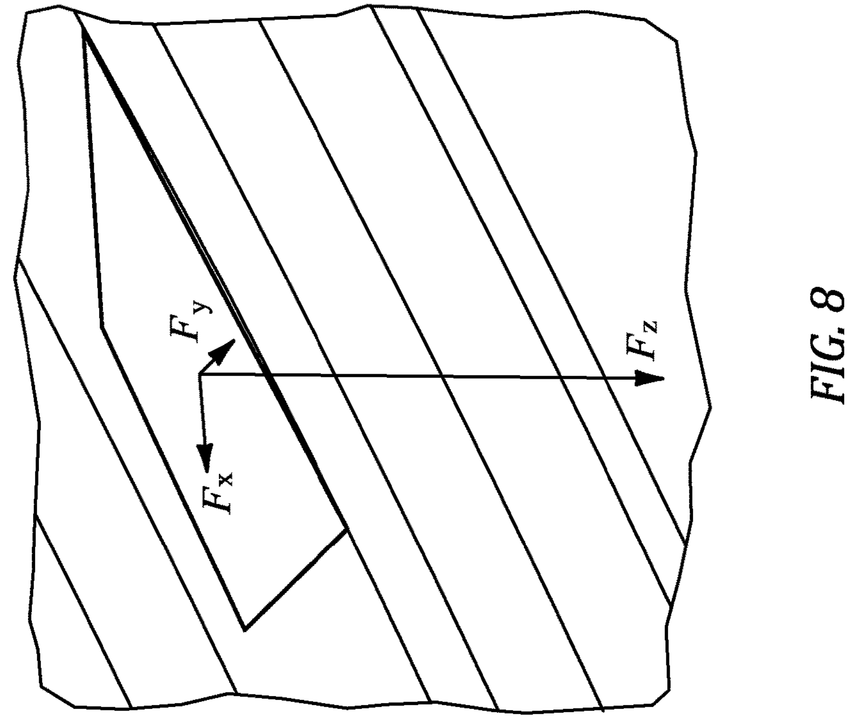
FIG. 8 is a view of frictional forces of planar contact.

FIG. 8 shows how CAD modeling engine 624 may specialize for frictional forces in 814. Here, two arbitrary but perpendicular directions are chosen in the plane of contact and forces of as-yet undetermined magnitude are assigned. Then 636 solves magnitudes of the frictional forces magnitudes part of the complete system in 840.

As a further variation, the force modeling and equilibrium framework 630 calculates forces arising in a milling process. The force modeler 635 supplies the subunit chip thickness 737 to the force building block 640 instead of subunit penetration 736. The force modeler 635 sends the CWE forces 732 to the global accumulator 637 and the remaining logic is followed as described earlier. While grinding forces are generally steady, milling forces may fluctuate due to the entry and exit of individual flutes within the CWE perimeter 730. The rests provide fluctuating reactions needed to balance these forces. The magnitude and frequency of the cyclical variation of forces calculated at the rests may require the user to design the mating surfaces at the rests appropriately.

The conversion of CLSteps 707 to specific machine tool axes motions is commonly referred to as post-processing and the converted CLSteps 707 is referred to as G-code. G-code command the machine tool axes to determines the positioning and timing of these axes. Machining verification platform 604 also simulates the chosen robot or machine tool axes' motion for commanded G-code.

The user may follow menus in the machining verification platform 604 to create alternate coordinate systems. The user may follow menus within tool manager 632 to store the alternate coordinate systems in the coordinate system list 634 for the machine tool, workpiece, fixtures, spindles, tool-changers, etc. G-code references these coordinate systems to perform motions other than material removal.

The machining verification platform 604 may deduce additional risks such as fixture-machine tool collisions and axes over-travel, part gouges/excess etc. and notify the user as above. In response, the user may adjust the post-processor to remedy adverse motions. Although illustrated in the context of CLSteps 707, use of the method 800 to G-code is applicable.

An alternate embodiment of basic process 800 disallows evaluation step 870 and 860. If the evaluation/determination 842 is not sufficiently positive, the user requests the vendor to iterate 850 on the design of the fixture.

Although illustrated in the context of a particular fixture and particular vane, other fixtures and parts are applicable. This may include metal parts such as automotive parts and biomedical parts (e.g., replacement joints) and mold dies for molding plastics.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline (e.g., part type and configuration, tool type and configuration, and machining process (baseline tool path), on the one hand and particular computer(s) and software packages on the other hand), details of such baseline may influence details of particular implementations. For example, although shown implemented on a single computer, multiple computers may be involved including the use of cloud computing, software as a service, and the like. Similarly, although a single tool is shown, multiple tools may be involved either simultaneously or sequentially. Also, particular baseline software and their particular file formats (digital formats of the model files) may influence the particular implementations. Accordingly, other embodiments are within the scope of the following claims.

What is claimed is:

1. A method for configuring a fixture for use in machining of sequential parts via a machine tool wherein a manipulator moves the machining element relative to the part being machined, the fixture comprising:
- a body;
- a plurality of part contact references for registering a part being machined; and
- at least one clamp for holding the part against the plurality of part contact references, the machine tool comprising:
- a machining element; and
- a driver coupled to drive the machining element about a rotation axis, the method comprising:
- for a planned machining movement of the machining element and using a model of the part and fixture:
  - computing respective reaction forces at the plurality of part contact references; and
  - responsive to computation of a negative reaction force at a said part contact reference, a modification comprising at least one of:
    - modifying in the model clamping force of the at least one clamp;
    - modifying in the model one or more positions of the at least one clamp;
    - modifying in the model one or more positions of the plurality of part contact references; and
    - modifying the planned machining movement.

2. The method of claim 1 wherein the manipulator moves the machine tool and the part remains stationary.

3. The method of claim 1 wherein the modification comprises:
- said modifying in the model clamping force of the at least one clamp.

4. The method of claim 1 wherein the modification comprises:
- said modifying in the model one or more positions of the at least one clamp.

5. The method of claim 1 wherein the modification comprises:
- said modifying in the model one or more positions of the plurality of part contact references.

6. The method of claim 1 wherein the modification comprises:
- said modifying the planned machining movement.

7. The method of claim 6 wherein the modification comprises:
- said modifying being a speed of the planned machining movement.

8. The method of claim 1 wherein the machining element is an abrasive element.

9. The method of claim 1 wherein the plurality of part contact references comprise:
- at least one datum pad characterized by a datum pad contact area; and
- at least one rest characterized by a rest contact area greater than the datum pad contact area.

10. The method of claim 9 wherein the modification does not comprise:
- modifying in the model any position of the at least one datum pad.

11. The method of claim 10 wherein:
- the computing and the modification are performed iteratively.

12. The method of claim 11 wherein the modification:
- reduces a reaction force of at least one of the datum pads.

13. The method of claim 12 wherein the reducing a reaction force:
- reduces a peak reaction force of a first of the datum pads and reduces a median reaction force of a second of the datum pads while reducing or eliminating a magnitude of said negative reaction force at a third of the datum pads.

14. The method of claim 1 wherein the computing respective reaction forces at the plurality of part contact references comprises:
- calculating machining forces associated with the machining movement; and
- based upon clamping forces and the calculated machining forces calculating the respective reaction forces at the plurality of part contact references.

15. The method of claim 14 further comprising inserting:
- pre-determined force vector(s) of the at least one clamp as said clamping forces; and
- unit vectors for the plurality of part contact references.

16. The method of claim 14 wherein the reaction forces are calculated by equation (2):

$$x_{ln} = m^T.(m.m^T)^{-1}.b$$

wherein:
- x is a column vector having as many rows as the number of part contact references;
- b is a column vector having six rows and is determined by superposition of XYZ force and moments caused by the clamping and machining forces in a work coordinate system (WCS);

m is a matrix with six rows and as many columns as the number of part contact references; and T transposes the matrix.

17. An apparatus configured to perform the method of claim 1 and comprising:

one or more processors; and storage containing programming for execution by the one or more processors, said programming configured to:

receive the model of the part and fixture; and compute said respective reaction forces at the plurality of part contact references.

18. A method for configuring a fixture for use in machining of sequential parts via a machine tool wherein a manipulator moves the machining element relative to the part being machined, the fixture comprising:

a body;

a plurality of part contact references for registering a part being machined; and at least one clamp for holding the part against the plurality of part contact references, the machine tool comprising:

a machining element; and a driver coupled to drive the machining element about a rotation axis, the method comprising:

for a planned machining movement of the machining element and using a model of the part and fixture:

a step for calculating machining forces associated with the machining movement; and a step for calculating respective reaction forces at the plurality of part contact references.

19. The method of claim 18 further comprising:

a step for determining whether a modifying of the planned machining movement is sufficient.

20. An apparatus configured modify a process for machining of sequential parts via a machine tool, wherein a manipulator moves the machining element relative to a fixture holding the part being machined, the fixture comprising:

a body;

a plurality of part contact references for registering a part being machined; and at least one clamp for holding the part against the plurality of part contact references, the machine tool comprising:

a machining element; and a driver coupled to drive the machining element about a rotation axis, the apparatus comprising:

one or more processors; and storage containing programming for execution by the one or more processors, said programming configured to:

receive the model of the part and fixture; and compute respective reaction forces at the plurality of part contact references.

21. The apparatus of claim 20 wherein:

the programming is configured to allow the user to modify in the model clamping forces/loads.

22. A non-transitory computer readable storage medium having data stored therein representing software executable by a computer, the software including instructions for executing a method for configuring a fixture for use in machining of sequential parts via a machine tool wherein a manipulator moves the machining element relative to the part being machined, the fixture comprising:

a body;

a plurality of part contact references for registering a part being machined; and at least one clamp for holding the part against the plurality of part contact references, the machine tool comprising:

a machining element; and a driver coupled to drive the machining element about a rotation axis, the method comprising:

for a planned machining movement of the machining element and using a model of the part and fixture:

computing respective reaction forces at the plurality of part contact references; and responsive to computation of a negative reaction force at a said part contact reference, a modification comprising at least one of:

modifying in the model clamping force of the at least one clamp;

modifying in the model one or more positions of the at least one clamp;

modifying in the model one or more positions of the plurality of part contact references; and modifying the planned machining movement.

* * * * *